Patented July 18, 1944

2,353,937

UNITED STATES PATENT OFFICE 2,353,937

AIR FILTERING MATERIAL

Irving Newton Smith, Granville, Ohio, assignor to Owens-Corning Fiberglas Corporation, a corporation of Delaware No Drawing. Application February 11, 1943, Serial No. 475,573

3 Claims. (Cl. 183—45)

The present invention relates to filters and filtering materials for use in filtering dust and the like from air or other gases. More particularly it relates to materials or substances to which dust will adhere, such material being applied to a porous base such as a pad of fibrous glass or to other suitable filtering media.

This application is a continuation-in-part of my copending application Serial No. 419,620, filed November 18, 1941.

The dust catching and retaining material or so-called adhesive previously used in air filters was usually petroleum oil. Although this material is effective as a dust catcher it is inflammable, thereby creating a fire hazard. In the case of a filter having a base of fibrous or shredded material, the fire hazard is increased due to the finely divided nature of the oil on the base.

It has been attempted to overcome these objections by using very heavy oils which are less inflammable although these, too, are combustible when exposed to flame. The heavy oils, however, because of their high viscosity, wet dust particles slowly and as a result the dust collecting efficiency of the filter was seriously lowered. It has also been suggested to add a fire-proofing material to low viscosity oil to secure non-inflammability. Many of the truly flame-proof compounds which could be added to such oils are solids so that the resulting flame-proof oil was of too great a viscosity.

An object of the present invention is to provide a filter adhesive free from the objections to previous materials. The material of the present invention is non-inflammable, odorless and inexpensive and has a large capacity for holding dust.

It is a further object of the present invention to provide a completely non-combustible dust catching filter material as distinguished from the merely non-inflammable materials heretofore employed. I obtain this object by providing a dust catching material in an aqueous system, the material consisting mainly of an inorganic substance. The combination of this material with an inorganic filter base such as glass wool provides a truly fireproof filter. It also provides a readily washable filter since the aqueous system and adhering dust may be easily rinsed from the base with water and without deleterious effect on the wool. The base may be then retreated by the application of fresh adhesive.

It is another object of the invention to provide an aqueous system as a dust catching adhesive that will maintain proper viscosities at all relative humidities to which the filter may be subjected in use. The adhesive is prevented from reaching such a low viscosity at high relative humidities that it will flow from the porous base, and from reaching at low relative humidities such high viscosities that it no longer is fully effective to catch dust particles.

I have discovered that a dust catching material having the desirable properties of non-combustibility, good dust catching efficiency, freedom from odor and low cost, may be obtained by employing a deliquescent inorganic substance that forms an aqueous solution of relatively low vapor pressure, thereby providing a permanent liquid that will effectively catch and retain dust particles.

Very extensive tests have shown that zinc chloride is particularly suited to the purpose of the present invention because it forms a water solution having a very low vapor pressure. The vapor pressure of such solution is approximately as low as the vapor pressure of atmospheric moisture at 5% relative humidity within the range of temperatures normally encountered by the filters in use. A humidity as low as 5% is very seldom, if ever, met with in the conditions under which air filters are employed so that the filter adhesive retains its liquidity under substantially all humidity conditions to which it may be subjected.

An aqueous solution of zinc chloride has considerable surface tension so that it wets most dust particles with difficulty and, therefore, is not fully effective as a filter adhesive for some types of dust. This is overcome in the present invention by adding a wetting agent to the zinc chloride solution. This wetting agent may be either a neutral wetting agent or a cation-active wetting agent. The anionic wetting agents have not been found suitable since they are precipitated by the zinc chloride.

An acid-stable neutral wetting agent that has been found very satisfactory is a modified mannitol monolaurate which is obtainable under the trade name of Atlas G-9046T. This may be replaced if desired by sorbitol monolaurate or by cation-active wetting agents of the type used in the dyeing of textiles or by other suitable wetting agents.

An adhesive of an aqueous solution of zinc chloride becomes more dilute as the relative humidity of the air passing through the filter increases. At high relative humidities of about 80% to 95% the adhesive may take up so much water from the air passing through the filter that the viscosity drops so low that the adhesive flows from the fibrous base, thereby impairing the efficiency of the filter.

To overcome this I have found it possible to control the viscosity of the adhesive over a wide range of relative humidities by incorporating in the adhesive a material with primary particles of colloidal dimensions and that is more soluble in concentrated than in dilute zinc chloride solutions. As the zinc chloride solution becomes more dilute such a material causes a progressive increase of viscosity so that the tendency of the adhesive to flow from the fibrous base at higher relative humidities is offset.

Several materials including carbohydrates, proteins, resins, gum and soaps have been found suitable to some extent for this purpose but tests have shown that cellulose is by far the most efficient material for controlling the viscosity of the zinc chloride adhesive and is effective over the widest range of relative humidity of the air being filtered.

In aqueous solutions of zinc chloride of about 60% or greater concentration, cellulose fibers swell and finally dissolve. Since a large proportion of the cellulose molecules are of colloidal size, a marked increase in viscosity results, and under some conditions even a gel may be formed. If a small quantity, say 0.5%, of cellulose be dissolved in 70° Bé. zinc chloride under mild conditions, that is low acidity, low temperature, and short time heating, a very viscous solution is obtained; a solution too viscous to apply to filter pads by most methods of application. If this solution be gradually diluted with water, it is observed that the first additions of water cause a marked decrease in viscosity. When the solution reaches a concentration of zinc chloride in the order of 55%, it begins to gel and at 50% is a very stiff gel. A very small addition of water beyond this point causes complete coagulation of the cellulose and liberation of the non-viscous zinc chloride solution. This means that with this adhesive on an air filter, a relative humidity as low as about 50% would be sufficient to cause bleeding of the zinc chloride solution from the filter.

The explanation of this gelation and coagulation of the cellulose upon dilution of the zinc chloride lies in the fact that the cellulose is soluble in concentrated zinc chloride, but not in water. In order to retain gel properties without coagulation at higher dilutions, (and hence higher humidities of the air passing through the filter) the solubility of cellulose in water must be increased. Increasing the solubility of cellulose, however, means shortening its chain length, and therefore reducing its viscosity and gel strength, which reductions are opposed to the results required, namely, an increase in the viscosity of the filter adhesive.

It is possible to obtain the results desired, however, if the cellulose is added in relatively large proportions. Thus, the cellulose preferably in the form of chemical cotton, is added to the zinc chloride solution in proportions of about 3% cotton on the basis of the zinc chloride solution at 70° Bé. The amount of cellulose may be varied from 1½% to 4% depending upon the humidity conditions to be encountered in use of the filter. To obtain solution of this much cellulose in the zinc chloride it is desirable to use the following procedure.

The 70° Bé. zinc chloride solution is first acidified by the addition of hydrochloric acid sufficient to make the solution about .1% hydrochloric acid. To this may be added the wetting agent in proportions of about 3 parts wetting agent to 1000 parts zinc chloride solution in the case of modified mannitol monolaurate. The acidified solution is then heated to about 80° C., and 3% by weight of cotton is added with vigorous agitation. The temperature is held at 80° C. for a time sufficient to obtain complete solution of all the cotton in the zinc chloride, which is usually five minutes. This time may vary with the temperature to which the solution is heated and with the amount of cotton added, and also with the acidity of the solution. Reduction in temperature and/or acidity will generally increase the time of heating. A longer heating period may be advantageous in some cases because the time is not then as critical and less accurate control need be maintained.

At the end of the heating period the solution is neutralized and preferably made slightly basic by adding sufficient sodium hydroxide to bring the zinc oxide content to about .3%. The mixture is then quickly cooled. It may be further diluted with water, if desired, for ease in application to the fibrous or other porous base. If the material is to be sprayed onto the fibrous base, it is preferable to dilute it to about 50% to 70%, preferably 60%, zinc chloride.

The adhesive of the present invention employed with a base of matted glass fibers forms a completely fireproof dust-catching filter suitable for filtering air in domestic and commercial heating and air conditioning systems and in other installations wherever dust of any nature is to be removed from a gaseous medium.

Various modifications of my invention may be made within the scope of the claims.

I claim:

1. Filter material comprising a porous base of fibrous glass of a porosity permitting the ready passage of air therethrough, and a coating thereon of zinc chloride in water solution, cellulose, and a wetting agent.

2. A filter material comprising a porous base of siliceous material, and a coating thereon of a 50% to 70% aqueous solution of zinc chloride, a wetting agent, and about 3% cellulose on the basis of the zinc chloride at 70° Bé.

3. A filter for gas comprising a base of glass wool, and a dust-catching adhesive on the base containing a 60% aqueous solution of zinc chloride, about .3% mannitol monolaurate, and about 3% cellulose on the basis of the zinc chloride at 70° Bé.

IRVING NEWTON SMITH.